United States Patent
Zoehrens et al.

(10) Patent No.: US 9,016,751 B2
(45) Date of Patent: Apr. 28, 2015

(54) MANUFACTURE OF A CURVED ROLLER BLIND FOR A STORAGE COMPARTMENT

(71) Applicants: Britta Zoehrens, Vilsbiburg (DE); Andreas Polland, Ergolding (DE); Yustinus Teguh Hendrata, Vilsbiburg (DE)

(72) Inventors: Britta Zoehrens, Vilsbiburg (DE); Andreas Polland, Ergolding (DE); Yustinus Teguh Hendrata, Vilsbiburg (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 0 days.

(21) Appl. No.: 13/713,655

(22) Filed: Dec. 13, 2012

(65) Prior Publication Data

US 2013/0147223 A1    Jun. 13, 2013

(30) Foreign Application Priority Data

Dec. 13, 2011  (DE) .......................... 10 2011 088 375

(51) Int. Cl.
| | |
|---|---|
| *B60R 7/04* | (2006.01) |
| *B60R 7/06* | (2006.01) |
| *B60J 1/20* | (2006.01) |
| *B23P 11/00* | (2006.01) |
| *B29C 45/14* | (2006.01) |
| *B29C 45/16* | (2006.01) |
| *B29L 31/30* | (2006.01) |

(52) U.S. Cl.
CPC .... *B60J 1/20* (2013.01); *B60R 7/04* (2013.01); *B23P 11/00* (2013.01); *Y10T 29/49826* (2015.01); *B60R 7/06* (2013.01); *B29C 45/14467* (2013.01); *B29C 45/1676* (2013.01); *B29L 2031/3005* (2013.01)

(58) Field of Classification Search
CPC ............ B60R 7/04; B60R 7/06; B60R 5/044; B60R 5/047; E06B 9/02; E06B 9/11; E06B 2009/0684; E06B 2009/1555

USPC .............. 296/24.34, 37.8, 136.04, 136.1; 49/74.1, 325

See application file for complete search history.

(56) References Cited

U.S. PATENT DOCUMENTS 2,690,216 A * 9/1954 Scott ............................ 220/350
3,870,391 A * 3/1975 Nims ............................ 312/297
(Continued)

FOREIGN PATENT DOCUMENTS

| DE | 94 03 833 U1 | 5/1994 |
|---|---|---|
| DE | 94 03 833.3 U1 | 6/1994 |

(Continued)

OTHER PUBLICATIONS

English translation of Extended Search Report mailed Mar. 22, 2013 for European Application No. 12194587.7-1706 (4 pages).

(Continued)

*Primary Examiner* — D Glenn Dayoan
*Assistant Examiner* — Jason S Daniels
(74) *Attorney, Agent, or Firm* — Wolf, Greenfield & Sacks, P.C.

(57) ABSTRACT

A method of manufacturing a roller blind and a roller blind is provided for opening and closing a tray, a storage compartment, a control panel or the like, particularly for use in motor vehicles. The roller blind includes a plurality of ribs manufactured from a hard component. A soft component joins the ribs to each other on a connecting side of the soft component. The soft component is manufactured with at least one underside opposite the connecting side that is flat along the direction of extension of the ribs.

19 Claims, 6 Drawing Sheets

(56) References Cited

U.S. PATENT DOCUMENTS

| | | | |
|---|---|---|---|
| 4,901,436 A * | 2/1990 | Gosch et al. | 30/43.92 |
| 4,961,895 A * | 10/1990 | Klein | 264/40.6 |
| 6,478,204 B2 | 11/2002 | Lange et al. | |
| 7,475,954 B1 * | 1/2009 | Latunski | 312/297 |
| 7,581,773 B2 * | 9/2009 | Strasser et al. | 296/1.09 |
| 7,588,280 B2 * | 9/2009 | Dobos et al. | 296/37.12 |
| 2002/0005424 A1 | 1/2002 | Lange et al. | |
| 2002/0070220 A1 * | 6/2002 | Kuehn et al. | 220/350 |
| 2004/0130174 A1 * | 7/2004 | Laskey | 296/37.1 |
| 2004/0163773 A1 | 8/2004 | Murray | |
| 2010/0239795 A1 | 9/2010 | Gat | |

FOREIGN PATENT DOCUMENTS

| | | |
|---|---|---|
| DE | 198 24 248.4 A1 | 12/1999 |
| DE | 10 2004 020 553 A1 | 11/2005 |
| EP | 0 960 778 A2 | 12/1999 |

OTHER PUBLICATIONS

English translation of Official Action mailed Oct. 12, 2012 for DE 10 2011 088 375.4 (3 pages).

* cited by examiner

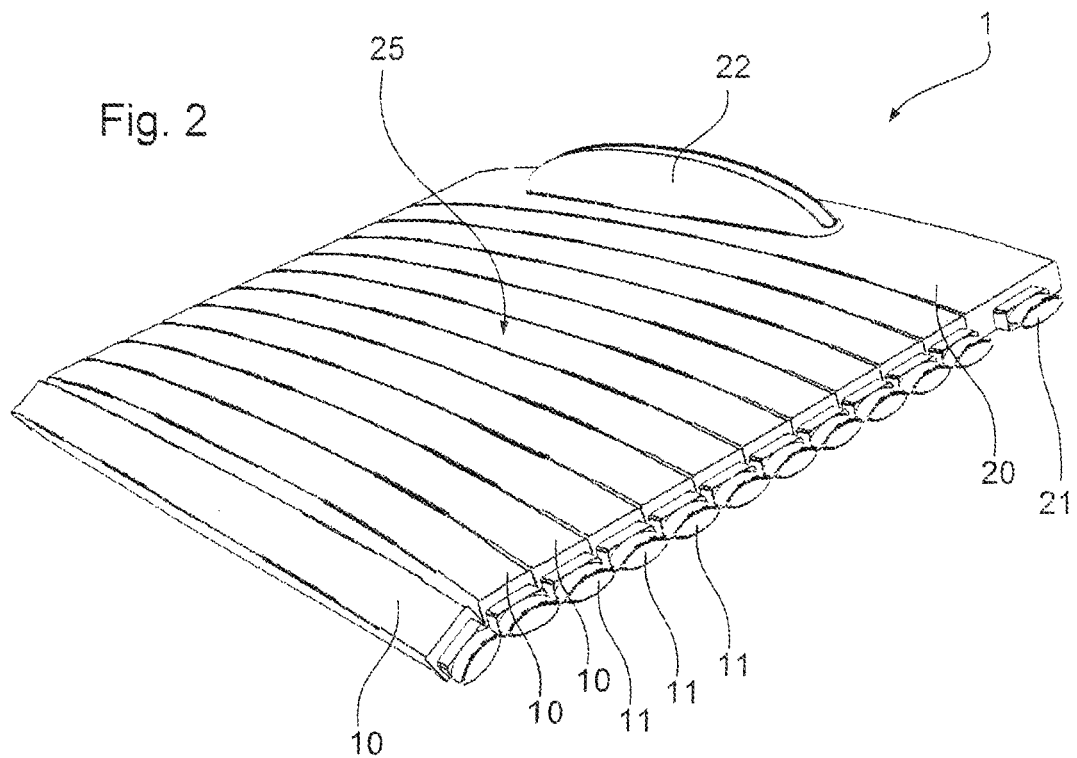

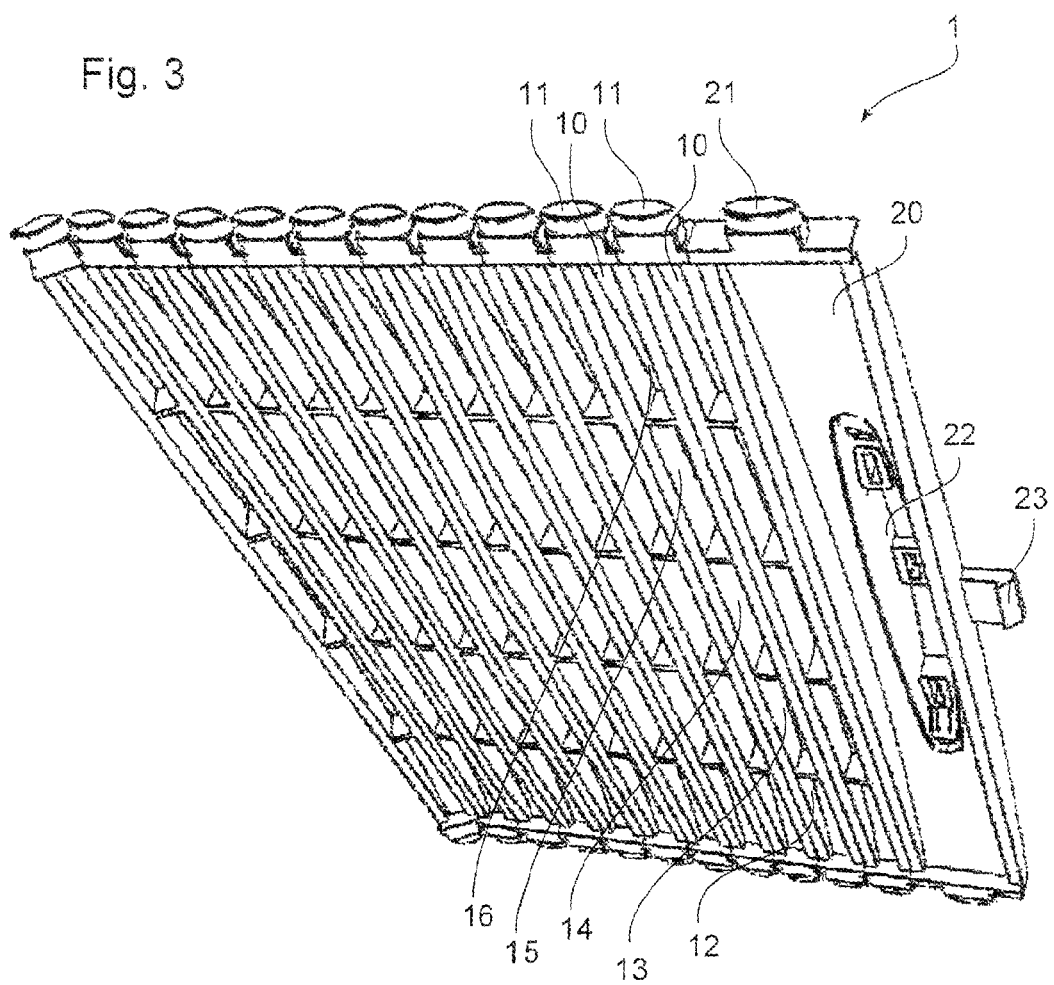

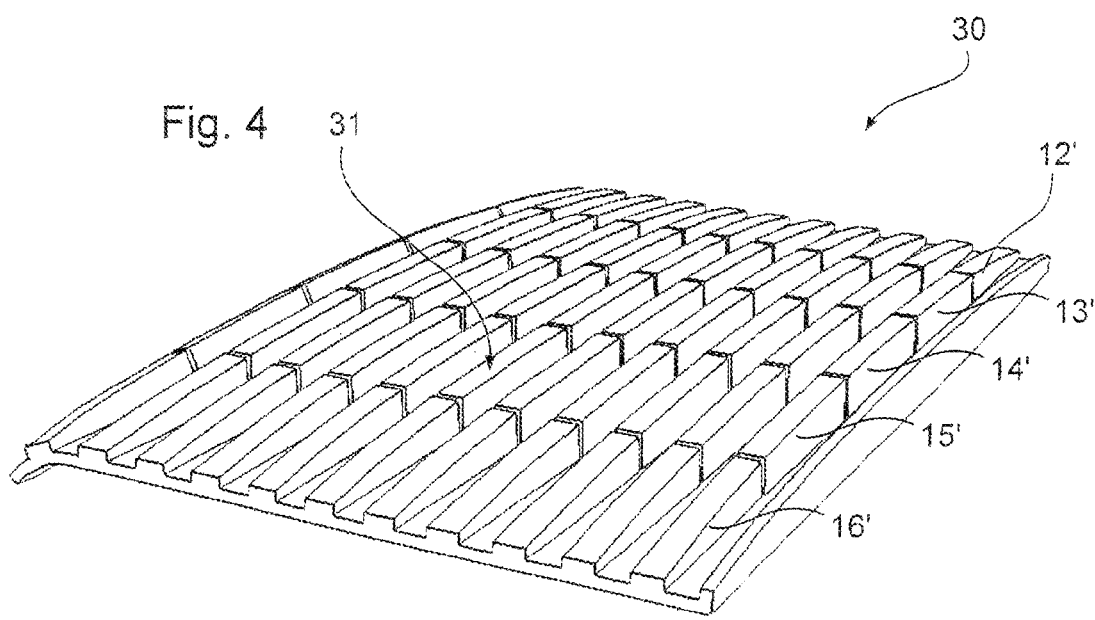

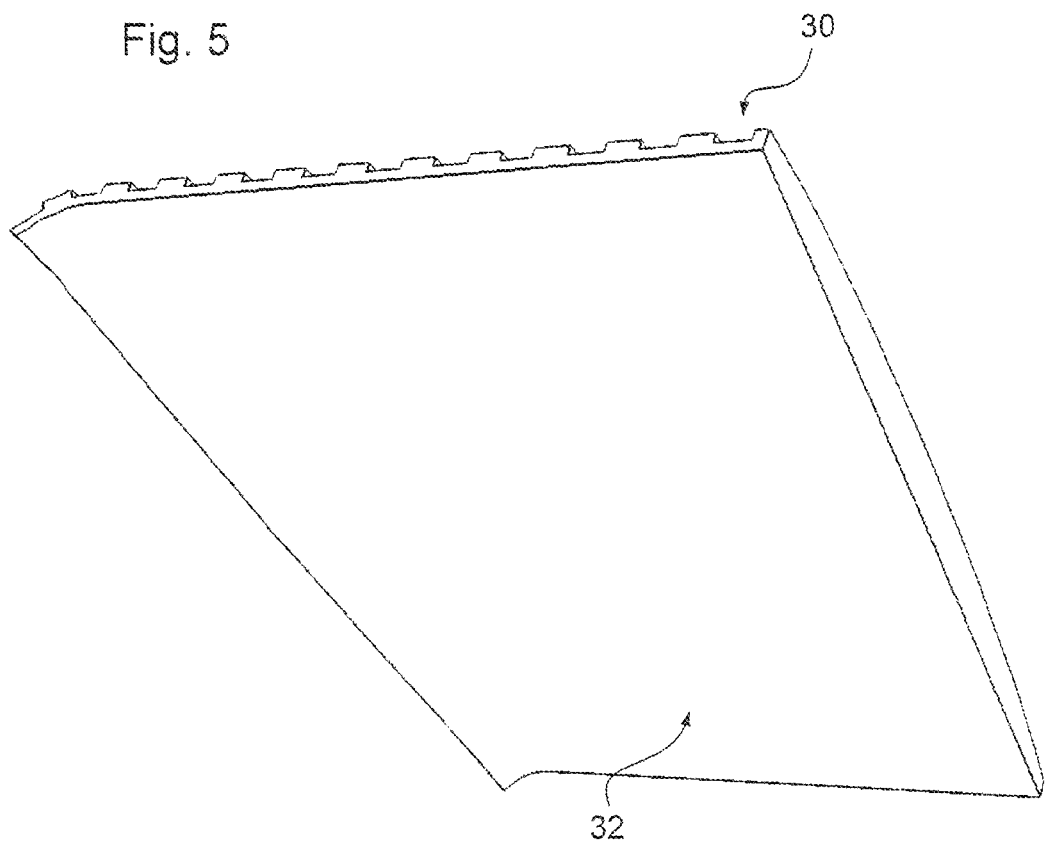

MANUFACTURE OF A CURVED ROLLER BLIND FOR A STORAGE COMPARTMENT

RELATED APPLICATION

Foreign priority benefits are claimed under 35 U.S.C. §119(a)-(d) of German application number 10 2011 088 375.4, filed Dec. 13, 2011, which is hereby incorporated by reference in its entirety.

BACKGROUND

1. Field

Aspects relate to a method of manufacturing a roller blind for opening and closing a compartment, such as a tray, a storage compartment or a control panel, particularly for use in motor vehicles. Aspects further relate to a roller blind for a motor vehicle.

2. Discussion of Related Art

For motor vehicles, particularly vehicles in upscale executive and luxury classes, special requirements are placed on the visual appearance of the vehicle interior, such as the facing of control elements, storage compartments and the like, particularly in the region of the center console. Roller blinds, which allow a sliding opening and closing of the areas to be covered manually or automatically, are conventionally used in certain regions of a motor vehicle.

A roller blind may be constructed of stiff ribs, manufactured by injection molding, which are joined to each using a soft component. The ribs include guide pins for engaging slide tracks along which the roller blind is opened and closed. The slide path is usually configured such that the roller blind is reversed out of a substantially horizontal alignment upon opening of the roller blind. The soft component joining the ribs facilitates the reversing or rolling up of the roller blind.

EP 1 717 105 B1 describes a roller blind having on its upper side, which is the visible side or face of the roller blind, a soft component designed as padding that is arranged on support elements which are strung together. Examples of other roller blinds with padding provided on the face as the soft component are disclosed in EP 1 690 740 A1 and DE 10 2005 023 062 B3.

In conventional roller blinds fitted with a soft component that spans and joins a plurality of ribs, it may be impossible or fairly difficult to implement a curvature on the roller blind, particularly along the direction of extension of the ribs.

FIG. 1 illustrates a curved rib S of a roller blind with a soft component W attached thereto. The roller blind may opened and closed by being wound around a rotary axis D. The soft component W has "neutral fiber" points P which are neither compressed nor stretched when the soft component W changes direction around the rotary axis D.

For a roller blind curved in the transverse direction (the direction of extension of the ribs), the distances between the points of neutral fiber P and the rotary axis D differ. However, the distance traveled by a neutral fiber P when rotated around the rotary axis D depends on the distance between the neutral fiber P and the rotary axis D. The greater the distance between the neutral fiber P and the rotary axis D, the longer the distance to be travelled by the neutral fiber.

Due to different distances between the points of neutral fiber P and the rotary axis D, it becomes considerably more difficult or even impossible to unroll the roller blind if the soft component W joins a plurality or all the ribs to each other as a closed layer. Such an integral nature of the soft component may, however, be desirable for reasons associated with cost, stability, durability and/or functionality of the blind. It may also be desirable to have the ability to freely design the surface contour on the visible side of the roller blind. In particular, it may be desirable to implement curvatures of the roller blind along the transverse direction and/or the longitudinal direction, i.e., along the direction of extension of the ribs and/or along the direction of motion of the roller blind, without functional limitations.

Against this background, an object of the invention is to provide a roller blind and a method for the manufacture of a roller blind for opening and closing a tray, a storage compartment, a control panel or the like, particularly for use in motor vehicles, which enable more flexible contouring of the roller blind surface without functional limitations.

SUMMARY

In one illustrative embodiment, a method is provided for manufacturing a roller blind for opening and closing a motor vehicle compartment. The method comprises providing a plurality of ribs manufactured from a hard component, and joining the ribs to each other on a connecting side of a soft component. The soft component is manufactured with at least one underside which is opposite the connecting side and flat along the direction of extension of the ribs.

In another illustrative embodiment, a roller blind is provided for opening and closing a motor vehicle compartment. The roller blind comprises a plurality of ribs composed of a hard component, and a soft component having a connecting side and at least one underside opposite the connecting side. The ribs are joined to each other on the connecting side of the soft component. The at least one underside is flat along the direction of extension of the ribs.

Various embodiments of the present invention provide certain advantages. Not all embodiments of the invention share the same advantages, and those that do may not share them under all circumstances.

Further advantages and features of the present invention, which may be implemented singly or in combination with one or a plurality of the features referred to above emerge from the following description of illustrative embodiments.

BRIEF DESCRIPTION OF DRAWINGS

Various embodiments of the invention will now be described, by way of example, with reference to the accompanying drawings, in which:

FIG. 2 is a perspective top view of a roller blind according to an embodiment of the invention with the soft component of the roller blind omitted for clarity;

FIG. 3 is a perspective bottom view of the roller blind of FIG. 2;

FIG. 4 is a perspective top view of a soft component for the roller blind of FIGS. 2 and 3 according to an embodiment of the invention;

FIG. 5 perspective bottom view of the soft component of FIG. 4;

DETAILED DESCRIPTION

Figure 1:
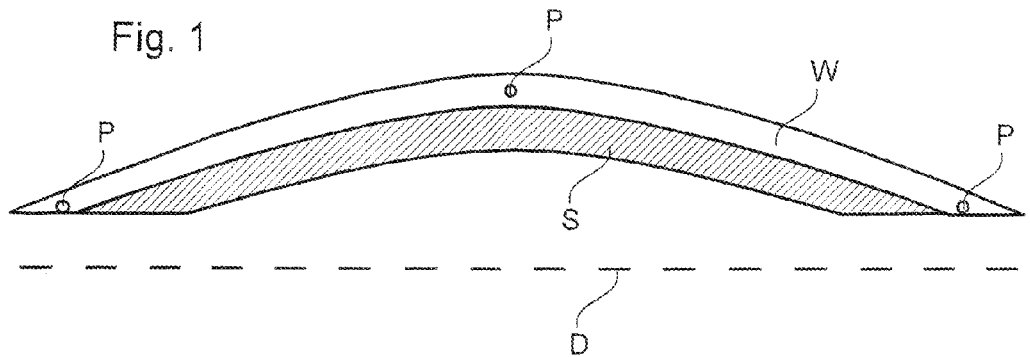
FIG. 1 is a schematic cross-section of a hypothetical roller blind for illustrating disadvantages of the prior art.

Aspects of the invention are based on the fabrication of a roller blind with a soft component and a plurality of ribs manufactured from a hard component. The ribs may be formed of a sufficiently sturdy plastic, although the choice of material for the ribs is not so limited as any suitable material may be used to form the ribs. The soft component may be produced from a material that is softer than the hard component including, but not limited to, a flexible plastic or foam material. The ribs are joined to each other with the help of the soft component. Preferably, the ribs may be joined so that they are aligned parallel next to each other and along their direction of extension.

The connection between the soft component and the ribs may be achieved by directly spraying a plastic material forming the soft component onto the ribs, such as described in greater detail below, and/or with an adhesive between the soft component and the ribs.

The ribs may be elongated and have a direction of extension which is transverse to the to opening/closing direction of the roller blind in the installed condition. The ribs may include a first guide, such as guide pins, on the sides of the ribs. In the installed condition of the roller blind, the guide pins may cooperate with a second guide, such as guide rails. The guide pins may engage the guide rails in such a manner that the roller blind may be moved to open and close the opening.

The ribs may be provided on a connecting side of the soft component. The roller blind may have a face which is the visible side of the roller blind that faces towards the passenger when the roller blind is closed. The ribs are located on the visible side or face of the roller blind.

The soft component may differ from a two-dimensional, thin layer, such as a thin fabric layer. In one embodiment, the soft component may have a considerable thickness and preferably a three-dimensional contour with recesses and protrusions. The back or underside of the soft component is flat (i.e. not curved) along the direction of extension of the ribs. The soft component may span the entire length of the ribs, in the direction of extension of the ribs, resulting in improved stability and overall integration.

The surface of the roller blind may have a three-dimensional contour on the visible side of the roller blind when the roller blind is positioned to close the opening. The designation of the visible side versus the rear of the roller blind is clearly defined even with the roller blind in an uninstalled condition. For example, the visible side of the roller blind serves as the decorative surface and differs visually from the rear. Furthermore, the direction of unrolling may be ascertained from the nature of the roller blind. As one of skill in the art would appreciate, the rear of the roller blind on which the soft component is located and the rear of the soft component, which is flat along the direction of extension of the ribs, are clearly defined.

The flat configuration of the rear of the soft component along the direction of extension of the ribs ensures that each of the points of the neutral fiber of the soft component is located at approximately the same distance from the rotary axis of a roller reversing the roller blind. The reversal is facilitated or at least simplified as a result of the location of the points of the neutral fiber and is independent of both the contour of the visible face of the individual ribs and the overall surface contour of the roller blind. The surface of the roller blind may be curved in both the opening/closing direction and a direction transverse thereto, for example, in the direction of extension of the ribs. The arch or curvature of the surface need not be uniform, i.e. the radius of curvature need not be fixed. In addition to a curvature, it is also contemplated that complex to structures or contours may be implemented as the surface design, for example, in the form of logos, lettering or patterns.

The rear of each rib may be provided with one or more indentations which may be configured, for example, in the shape of, but not limited to, recesses, hollows or spaces of a rib structure. In one embodiment, the ribs may be joined to each other after their manufacture using the soft component by bringing the recesses of the ribs into engagement with corresponding protrusions of the soft component. In this manner, the soft component may have an accurately fitting correspondence with the rear contour of the ribs such that protrusions of the soft component can be brought into engagement with the corresponding recesses of the ribs. With the soft component in engagement with the recesses of the ribs, the ribs are both interconnected and aligned relative to each other by the protrusions of the soft component. As a result, a sturdier and, if desired, closer cohesion of the ribs is achieved which also becomes noticeable due to an improved and durable surface finish of the roller blind.

The ribs may be inserted in a tool prior to being joined to the soft component in such a manner that the ribs are pressed firmly against each other. As the ribs are pressed firmly against each other in the tool and as the ribs are joined with the soft component in this condition, joining of the ribs is improved for permanently retaining a desirable contour of the roller blind surface.

The soft component may be injected under the ribs after inserting the ribs into the tool in such a manner that the ribs are joined to each other. By injecting and under-injecting with the soft component, an excellent connection is created between the ribs and the soft component. Additionally, the soft component may be injected with the ribs positioned in the roller blind's desired surface contour, such that a virtually integral structure is created with the desired geometry of ribs and soft component.

As indicated above, the ribs may be injection molded from a plastic. The ribs may be produced, for example, in any number of injection mold nests as should be apparent to one of skill in the art. However, it is also contemplated, particularly regarding a roller blind without a unidirectional curvature, for the ribs to be produced in an injection molding cycle to create the desired curved surface by simply pushing the ribs together.

The ribs and the soft component may be manufactured as a multiple component injection molding using a single injection molding process as should be apparent to one of skill in the art. Such a process may be carried out, for example, in a single tool such that manufacture may be carried out efficiently and inexpensively.

The ribs may be configured to have an identical shape or different geometries depending on the desired contour of the roller blind surface. In one embodiment, the cross-sections of the ribs may vary in a direction perpendicular to their direction of extension. The surface contour of the roller blind may be designed in advance, for example, using a CAD system, as should be apparent to one of skill in the art. The design may then be virtually "cut up" in such a way that individual segments or ribs may be produced in one or a plurality of injection molding cycles.

The ribs may be provided with a decorative layer to increase the value of the roller blind or to define an appropriate surface decoration for the roller blind.

The roller blind may be used, for example, for closing a storage compartment in a motor vehicle interior. Other possible applications for the roller blind may include, but are not limited to, center consoles, instrument panels, door trims and front side trims for motor vehicles, and interior trims in aircraft.

In one embodiment as illustrated in FIG. 2, a roller blind arrangement 1 may include a plurality of ribs 10 and an operating element 20, which may be a specially configured rib 10. The ribs 10 (including the operating element 20) may be positioned next and parallel to each other and form (except for the very first rib which is shown in a position that is already reversed) a substantially closed surface 25 which provides a visible surface of the roller blind that is visible to a passenger when the roller blind is closed in the installed condition.

Each rib 10 may include a guide pin 11 which engages, in the installed condition, with a rail (not shown) along which the opening/closing motion of the roller blind occurs. As illustrated in FIG. 2, only one guide pin 11 is visible for each rib 10. However, each rib 10 may be provided with two guide pins 11 which are attached laterally on opposite sides of the rib. The guide pins may be formed integrally with the ribs or may be attached to the ribs using any suitable arrangement as should be apparent to one of skill in the art.

The operating element 20 may also include two guide pins 21 (only one pin is visible in FIG. 2). In one embodiment, the operating element 20 may include a handle 22 for manually moving the roller blind open and closed.

In one embodiment, the visible side of the surface of the roller blind may be curved in a direction transverse to the opening/closing direction of the roller blind, for example, along the direction of extension of the ribs 10, 20 of the roller blind. Additionally or alternatively to the transverse curvature, a longitudinal curvature may also be provided along the opening/closing to direction of the roller blind (not shown). Various surface contours with fixed and variable radii of curvature can be implemented with excellent functionality of the roller blind.

Although the roller blind is illustrated with eleven (11) ribs 10 of identical geometry, the roller blind may employ any number of ribs that may differ from each other partially or completely in terms of their geometry, their material and/or other properties as should be apparent to one of skill in the art.

In one embodiment illustrated in FIG. 3, each rib 10, 20 may include one or more recesses 12, 13, 14, 15, 16. If desired, a locking catch 23 may be provided on the operating element 20 for locking the roller blind in the closed position.

In one embodiment illustrated in FIG. 4, a soft component 30 may be provided for pivotally joining the ribs 10, 20 relative to each other. As shown, the soft component 30 includes a connecting side 31 which is brought into connection with the ribs 10, 20. The soft component 30 may include one or more protrusions 12', 13', 14', 15', 16' which are brought into engagement with the recesses 12, 13, 14, 15, 16 of the ribs.

In one embodiment, the soft component 30 may be manufactured from a flexible plastic material, although any suitable material may be used as should be apparent to one of skill in the art. In one embodiment, the connection between the soft component 30 and the ribs 10, 20 may be effected by injecting the material of soft component 30 directly onto the rear of the ribs 10, 20. Alternatively, the soft component 30 may be produced independently of the ribs 10, 20 and subsequently joined to the ribs with or without an adhesive.

As shown in FIG. 5, the soft component 30 includes an underside 32. In one embodiment, the underside 32 is flat (i.e. not curved) along the direction of extension of the ribs 10, which is a direction transverse to the opening/closing direction of the roller blind. In one embodiment, the underside 32 of the soft component 30 is flat even in the closing position for the opening, i.e. the position in which the roller blind closes the opening.

By connecting the soft component 30 to the ribs 10, 20 via the protrusions and recesses, the ribs 10, 20 obtain a stability and, if necessary, a pretension that allows implementation of a durable surface finish of the roller blind even with complicated surface contours. In one embodiment, the soft component 30 may be injected under the ribs 10, 20 in a manner that each of the ribs 10, 20 and the soft component 30 enter into a very close, virtually integral connection. By aligning and pressing the ribs 10 (with or without an operating element 20) against each other in a tool beforehand, the soft component 30 may be produced directly on the to desired contour for the roller blind. In this manner, it may be possible to minimize manufacturing tolerances which over time could lead to gaps between the ribs 10, 20 on the visible side of the roller blind.

Figure 6A:
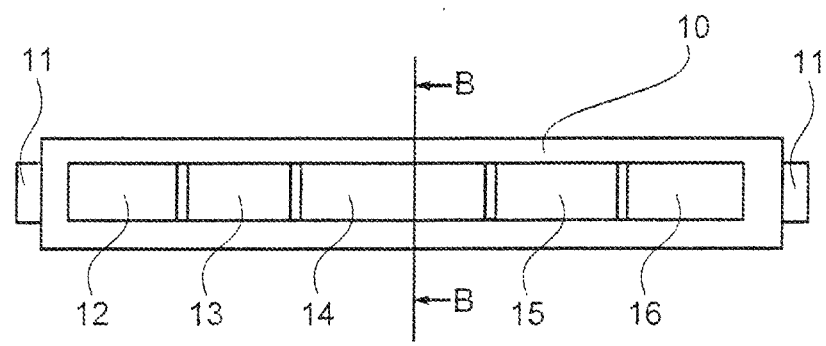
FIG. 6a is a schematic bottom view of a rib of the roller blind according to an embodiment of the invention.
Figure 6B:
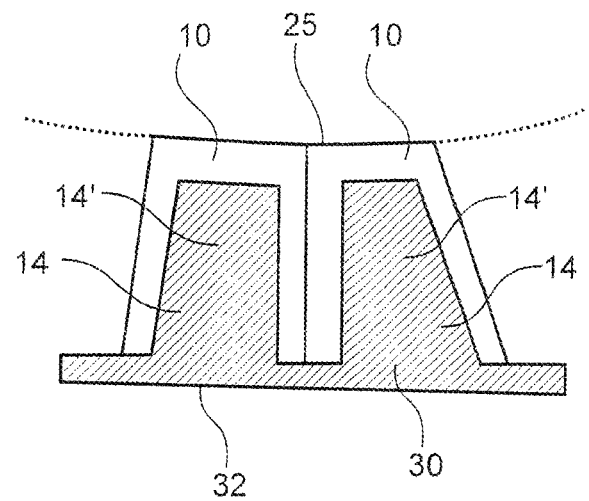
FIG. 6b is a schematic cross-sectional view of two ribs, along section line B-B of FIG. 6a, shown perpendicular to the direction of extension of the ribs according to an embodiment of the invention.

In one embodiment shown in FIG. 6a, a rib 10 may include a plurality of recesses or hollows 12, 13, 14, 15, 16 and guide pins 11. In one embodiment shown in FIG. 6b, at least two of the ribs 10 may have different cross-sectional configurations. The soft component 30 may be joined to a rib by introducing corresponding protrusions 14' into the hollows 14 (only hollows 14 are shown in FIG. 6b). As shown, a solid and planar contact of the ribs 10 against each other is assured along their contact surfaces due to the elasticity of the soft component 30 and the significant introduction depth of the protrusions 14' into the hollows 14. Such an arrangement ensures that the roller blind has a closed surface with a durable finish. In one embodiment as shown in FIG. 6b, the cross-section of the ribs 10 may be varied to model the contour of the visible surface of the roller blind.

Figure 7A:
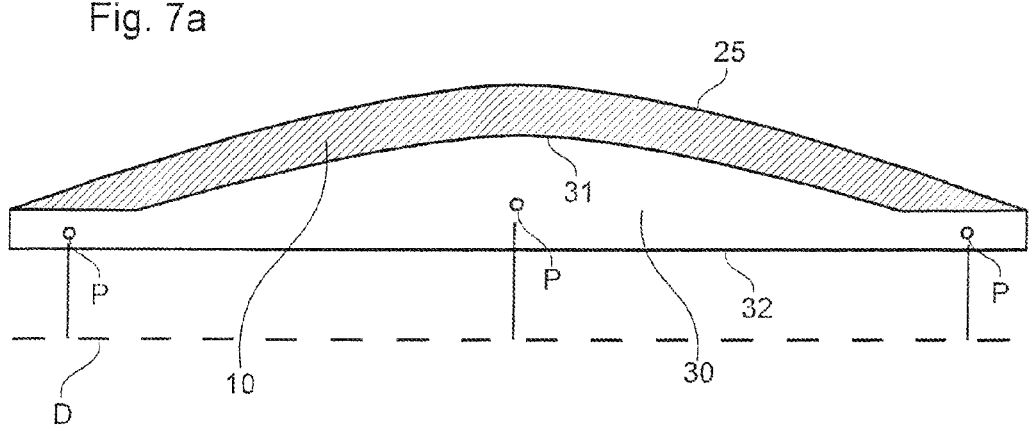
FIGS. 7a and 7b illustrate schematic cross-sections of a roller blind according to other embodiments.
Figure 7B:
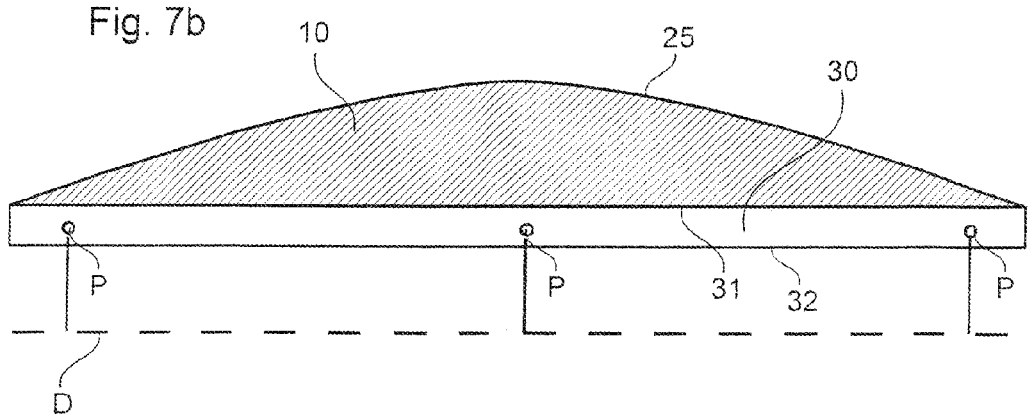

In the illustrative embodiments shown in FIGS. 7a and 7b, the roller blind includes a plurality of ribs 10 and a soft component 30. Due to the flat bottom surface of the soft component 30, each point of neutral fiber P is located at substantially the same distance from the rotary axis D. As shown in the embodiment of FIG. 7a, the upper side of the soft component 30 may be configured to follow the curvature of ribs 10. As shown in the embodiment of FIG. 7b, the soft component 30 may be configured to be flat on both the underside 32 and the connecting side 31. It is to be appreciated that the upper side of the soft component may be configured to have any suitable shape as should be apparent to one of skill in the art.

What is claimed is:
1. A method of manufacturing a roller blind for opening and closing a motor vehicle compartment, the method comprising:
   providing a plurality of ribs manufactured from a hard component; and
   joining the ribs to each other on a connecting side of a soft component, the soft component being manufactured with at least one underside which is opposite the connecting side and flat along the direction of extension of the ribs,
   wherein the roller blind, in a closed condition, has a visible side that is curved in a direction transverse to the closing direction of the roller blind.
2. The method according to claim 1, wherein one or more of the ribs are manufactured with the soft component, the one or more ribs having a plurality of recesses, the method further comprising connecting the ribs to the soft component by bringing the recesses of the ribs into engagement with corresponding protrusions of the soft component.

3. The method according to claim 1, further comprising inserting the ribs in a tool, prior to joining the ribs to the soft component, with the ribs lying firmly against each other.

4. The method according to claim 3, further comprising injecting the soft component under the ribs such that the soft component joins the ribs to each other in the tool.

5. The method according to claim 1, wherein the ribs are injection molded from a plastic.

6. The method according to claim 1, wherein the ribs and the soft component are manufactured as a multiple component injection molding in an injection molding process.

7. The method according to claim 1, wherein the motor vehicle compartment is a tray, a storage compartment, or a control panel.

8. The method according to claim 1, wherein at least three neutral fiber points in the soft component spaced along the direction transverse to the closing direction of the roller blind are equidistant from a rotary axis of the roller blind.

9. A roller blind for opening and closing a motor vehicle compartment, the roller blind comprising:
- a plurality of ribs composed of a hard component; and
- a soft component having a connecting side and at least one underside opposite the connecting side, the ribs being joined to each other on the connecting side of the soft component, the at least one underside being flat along the direction of extension of the ribs,
- wherein the roller blind, in a closed condition, has a visible side that is curved in a direction transverse to the closing direction of the roller blind.

10. The roller blind according to claim 9, wherein one or more of the ribs on the connecting side are provided with the soft component, the one or more ribs having at least one recess, the one or more ribs being connected to the soft component with the at least one recess in engagement with a corresponding protrusion of the soft component.

11. The roller blind according to claim 9, wherein the soft component is injected onto the ribs.

12. The roller blind according to claim 9, wherein the ribs are injection molded from a plastic.

13. The roller blind according to claim 9, wherein the plurality of ribs includes ribs of different geometries.

14. The roller blind according to claim 9, wherein the ribs include a decorative layer on a side thereof facing away from the connecting side.

15. The roller blind according to claim 9, wherein the soft component essentially spans the entire length of the ribs in the direction of extension of the ribs.

16. The roller blind according to claim 9, wherein the underside of the soft component, when the roller blind is in a closed condition, is flat in both the direction of extension of the ribs and in the opening/closing direction of the roller blind.

17. The roller blind according to claim 9, wherein the motor vehicle compartment is a tray, a storage compartment, or a control panel.

18. The roller blind according to claim 9, wherein at least three neutral fiber points in the soft component spaced along the direction transverse to the closing direction of the roller blind are equidistant from a rotary axis of the roller blind.

19. A roller blind for opening and closing a motor vehicle compartment, the roller blind comprising:
- a plurality of ribs composed of a hard component; and
- a soft component having a connecting side and at least one underside opposite the connecting side, the ribs being joined to each other on the connecting side of the soft component, the at least one underside being flat along a direction transverse to a closing direction of the roller blind,
- wherein the roller blind, in a closed condition, has a visible side that is curved in the direction transverse to the closing direction of the roller blind,
- and wherein at least three neutral fiber points in the soft component spaced along the direction transverse to the closing direction of the roller blind are equidistant from a rotary axis of the roller blind.

* * * * *